(12) United States Patent
Nelson (10) Patent No.: US 8,400,468 B2
(45) Date of Patent: Mar. 19, 2013

(54) PROJECTOR MASKS FOR CALIBRATING PROJECTOR-BASED DISPLAY SYSTEMS

(75) Inventor: Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 874 days.

(21) Appl. No.: 12/549,028

(22) Filed: Aug. 27, 2009

(65) Prior Publication Data

US 2011/0050887 A1 Mar. 3, 2011

(51) Int. Cl.
*G09G 5/00* (2006.01)
*G06K 9/20* (2006.01)

(52) U.S. Cl. .................. 345/626; 382/263; 382/294

(58) Field of Classification Search .............. 345/591, 345/589, 626; 382/283, 294
See application file for complete search history.

(56) References Cited

U.S. PATENT DOCUMENTS

| 7,116,379 | B2 | 10/2006 | Suzuki | |
|---|---|---|---|---|
| 7,119,833 | B2 * | 10/2006 | Jaynes et al. | 348/189 |
| 7,270,421 | B2 | 9/2007 | Shinozaki | |
| 2005/0001986 | A1 * | 1/2005 | Matsuda | 353/31 |
| 2008/0266321 | A1 * | 10/2008 | Aufranc et al. | 345/626 |

FOREIGN PATENT DOCUMENTS

| CN | 1244228 C | 3/2006 |
|---|---|---|
| CN | 1913603 A | 2/2007 |
| JP | 2002-148710 A | 5/2002 |
| JP | 2007-047438 A | 2/2007 |
| KR | 20050078993 A | 8/2005 |
| WO | 02/19704 A2 | 3/2002 |

OTHER PUBLICATIONS

Yalla, V., "A Novel Geometric Calibration Technique for Scalable Multi-projector Displays", Center for Visualization and Virtual Environments, Department of Electrical & Computer Engineering, Univ. of KY, Sep. 25, 2006.
Raij, A., et al., "PixelFlex2: A Comprehensive, Automatic, Casually-Aligned Multi-Projector Display", IEEE International Workshop on Projector-Camera Systems, 2003.

\* cited by examiner

*Primary Examiner* — Xiao M. Wu
*Assistant Examiner* — Scott E Sonners (57) ABSTRACT

Methods having corresponding apparatus and tangible computer-readable media comprise: capturing a first image of ambient light upon a surface; generating a first grayscale image based on a selected color channel of the first image; projecting a primary color of light upon the surface; capturing a second image of the primary color of light projected upon the surface; generating a second grayscale image based on the selected color channel of the second image; generating a difference image, comprising subtracting the first grayscale image from the second grayscale image; and generating a projector mask, comprising detecting edges of a shape in the difference image, and reproducing the shape based upon the edges of the shape.

21 Claims, 12 Drawing Sheets

```
public final int startOffset;     // Starting offset of line width sample, not-inclusive, offset value of zero before
non-zero line values
public final int endOffset;       // Ending offset of line width sample, not-inclusive, offset value of zero after non-
zero line values
public final int middleOffset;    // Middle offset of line
public final int maxOffset;       // Offset of maximum value within line width sample
public final int maxOffsetValue;  // Actual maximum value located at maxOffset
```

FIG. 11

```
// Ring buffer containing recent max offset amounts
private RingBuffer<Integer> ringBufferMaxOffset = new
RingBuffer<Integer>(AVERAGE_SAMPLES_MAX_OFFSET);
// Ring buffer containing recent max offset values
private RingBuffer<Integer> ringBufferMaxOffsetValues = new
RingBuffer<Integer>(AVERAGE_SAMPLES_MAX_OFFSET_VALUES);
private final int initialMaxOffset; // Max offset found during initial line detection, usually middle of line. Set to -1
for lines found after initial search
private int offset;              // Current offset into pixel row/column buffer to start search for line width sample
private int maxOffset;           // Offset of maximum value found in line width sample
private int maxOffsetValue;      // Maximum value found when searching for line width sample
private boolean tracking = true; // Currently following the line, valid data
private int missingPixelCount = 0; // Number of missing pixels found. Reset to zero when valid line sample
found
private final boolean addedLine;  // True if line found after initial detection. Does not intersect with center line of
image
private int startOffset;          // Offset of start of line, non-inclusive
private int endOffset;            // Offset of end of line, non-inclusive
```

FIG. 12

```
logger.debug("enhanceColumns middle row up to height=" + height);
final int lastRow = height - EDGE_BORDER;
for (int y=middleRow; y < height; y++) {
    rowPixels = raster.getPixels(0, y, width, 1, rowPixels);
    processRow(y,rowPixels,rasterOut);
    if (y < lastRow) {
        checkMore(rowPixels,y);
    }
}
```

FIG. 13

```
public BufferedImage fillColumns(BufferedImage verticalLeft,BufferedImage verticalRight) {
    logger.debug("fillColumns In");

final int width = verticalLeft.getWidth();
    final int height = verticalLeft.getHeight();

BufferedImage bufferedImage = new BufferedImage(width, height,
BufferedImage.TYPE_BYTE_GRAY);

WritableRaster outRaster = bufferedImage.getRaster();
    Raster verticalLeftRaster = verticalLeft.getRaster();
    Raster verticalRightRaster = verticalRight.getRaster();

int[] pixelVerticalLeft = new int[1];
    int[] pixelVerticalRight = new int[1];
    int[] pixel255 = new int[1];
    pixel255[0] = 255;

boolean bColumnStart = false;

for (int j = 0; j < height; j++) { bColumnStart = false;
        // First left to right
        for (int i = 0; i < width; i++) {
            verticalLeftRaster.getPixel(i, j, pixelVerticalLeft);
            if (pixelVerticalLeft[0] == 255) {
                verticalRightRaster.getPixel(i, j, pixelVerticalRight);
                if (pixelVerticalRight[0] != 255) {
                    bColumnStart = true;
                    outRaster.setPixel(i, j, pixel255);
                }
            }
            else if (bColumnStart == true) {
                verticalRightRaster.getPixel(i, j, pixelVerticalRight);
                if (pixelVerticalRight[0] == 255) {
                    outRaster.setPixel(i, j, pixel255);
                    bColumnStart = false;
                }
            }
        }
```

*FIG. 14A*

```
      bColumnStart = false;
      // Then right to left
      for (int i = width - 1; i >= 0; i--) {
         verticalRightRaster.getPixel(i, j, pixelVerticalRight);
         if (pixelVerticalRight[0] == 255) {
            verticalLeftRaster.getPixel(i, j, pixelVerticalLeft);
            if (pixelVerticalLeft[0] != 255) {
               bColumnStart = true;
               outRaster.setPixel(i, j, pixel255);
            }
         }
         else if (bColumnStart == true) {
            verticalLeftRaster.getPixel(i, j, pixelVerticalLeft);
            if (pixelVerticalLeft[0] == 255) {
               bColumnStart = false;
            }
            outRaster.setPixel(i, j, pixel255);
         }
      }
   }
   logger.debug("fillColumns Out");
   return bufferedImage;
}
```

FIG. 14B

```
      bRowStart = false;
      // Next bottom to top
      for (int j = height - 1; j >= 0; j--) {
         horizontalBottomRaster.getPixel(i, j, pixelHorizontalBottom);
         if (pixelHorizontalBottom[0] == 255) {
            horizontalTopRaster.getPixel(i, j, pixelHorizontalTop);
            if (pixelHorizontalTop[0] != 255) {
               bRowStart = true;
               outRaster.setPixel(i, j, pixel255);
            }
         }
         else if (bRowStart == true) {
            horizontalTopRaster.getPixel(i, j, pixelHorizontalTop);
            if (pixelHorizontalTop[0] == 255) {
               bRowStart = false;
            }
            outRaster.setPixel(i, j, pixel255);
         }
      }
   }
   logger.debug("fillRows Out");
   return bufferedImage;
}
```

FIG. 15B

```
public BufferedImage fillRows(BufferedImage horizontalTop, BufferedImage horizontalBottom) throws
IOException {
    logger.debug("fillRows In");

final int width = horizontalTop.getWidth();
    final int height = horizontalTop.getHeight();

BufferedImage bufferedImage = new BufferedImage(width, height,
BufferedImage.TYPE_BYTE_GRAY);

WritableRaster outRaster = bufferedImage.getRaster();
    Raster horizontalTopRaster = horizontalTop.getRaster();
    Raster horizontalBottomRaster = horizontalBottom.getRaster();

int[] pixelHorizontalTop = new int[1];
    int[] pixelHorizontalBottom = new int[1];
    int[] pixel255 = new int[1];
    pixel255[0] = 255;

boolean bRowStart = false;

for (int i = 0; i < width; i++) { bRowStart = false;
      // First top to bottom
      for (int j = 0; j < height; j++) {
        horizontalTopRaster.getPixel(i, j, pixelHorizontalTop);
        if (pixelHorizontalTop[0] == 255) {
          horizontalBottomRaster.getPixel(i, j, pixelHorizontalBottom);
          if (pixelHorizontalBottom[0] != 255) {
            bRowStart = true;
          }
        }
        else if (bRowStart == true) {
          horizontalBottomRaster.getPixel(i, j, pixelHorizontalBottom);
          if (pixelHorizontalBottom[0] == 255) {
            outRaster.setPixel(i, j, pixel255);
            bRowStart = false;
          }
          outRaster.setPixel(i, j, pixel255);
        }
      }
```

*FIG. 15A*

PROJECTOR MASKS FOR CALIBRATING PROJECTOR-BASED DISPLAY SYSTEMS

FIELD

The present disclosure relates to camera-based calibration of projector display systems. More particularly, the present disclosure relates to generating projector masks for the calibration.

BACKGROUND

In multi-projector systems, a casually-arranged set of projectors can produce a large combined display having undesirable artifacts including projection overlaps due to geometric distortions caused by misalignment of the projectors, keystoning, and the like. These artifacts can be mitigated by calibrating the system using a camera.

In calibration, one or more calibration patterns are projected upon a display surface, and high-resolution digital images of the calibration patterns are captured by a digital camera. The captured images are processed to determine a correspondence between pixels of the camera and pixels of the projectors. This correspondence is used to transform image pixels to projector pixels for correcting the above-mentioned projection artifacts. However, the high-resolution calibration images captured by the camera can include large amounts of data.

Projector masks are commonly used during calibration to isolate calibration data for each projector. During calibration of each projector, a corresponding projector mask is used to extract the relevant data from the captured calibration images, thereby reducing the amount of data to be processed. However, in order to use this technique, the projector masks must be accurate.

SUMMARY

In general, in one aspect, an embodiment features a method comprising: capturing a first image of ambient light upon a surface; generating a first grayscale image based on a selected color channel of the first image; projecting a primary color of light upon the surface; capturing a second image of the primary color of light projected upon the surface; generating a second grayscale image based on the selected color channel of the second image; generating a difference image, comprising subtracting the first grayscale image from the second grayscale image; and generating a projector mask, comprising detecting edges of a shape in the difference image, and reproducing the shape based upon the edges of the shape.

Embodiments of the method can include one or more of the following features. Some embodiments comprise projecting a calibration pattern from a projector onto the display surface, wherein the projector is described by a projector space comprising a first plurality of first pixel locations; capturing a third image of the calibration pattern, wherein the first image, the second image, and the third image each conform to a virtual display space, wherein the virtual display space comprises a second plurality of second pixel locations; and determining a correspondence between the first pixel locations and the second pixel locations based upon the projector mask and the third image. Some embodiments comprise selecting a portion of the third image based on the projector mask; and determining the correspondence based upon the portion of the third image. Some embodiments comprise projecting a further image based on the correspondence. Some embodiments comprise generating an enhanced difference image, comprising enhancing the edges of the shape; wherein reproducing the shape comprises reproducing the shape based upon the edges of the shape in the enhanced difference image. In some embodiments, the shape has four edges, and the method further comprises filling columns between left and right edges of the shape; filling rows between top and bottom edges of the shape; and combining the columns and rows. In some embodiments, the first image is an RGB image; the second image is an RGB image; and the selected color channel of the first image is a green color channel.

In general, in one aspect, an embodiment features an apparatus comprising: a camera to capture a first image of ambient light upon a surface; a grayscale module to generate a first grayscale image based on a selected color channel of the first image; a projector to project a primary color of light upon the surface, wherein the camera captures a second image of the primary color of light projected upon the surface, and wherein the grayscale module generates a second grayscale image based on the selected color channel of the second image; a difference module to generate a difference image based on the first grayscale image and the second grayscale image; and a mask module to generate a projector mask, wherein the mask module comprises an edge detection module to detect edges of a shape in the difference image, and a reproduction module to reproduce the shape based upon the edges of the shape.

Embodiments of the apparatus can include one or more of the following features. In some embodiments, the projector projects a calibration pattern onto the display surface, wherein the projector is described by a projector space comprising a first plurality of first pixel locations; wherein the camera captures a third image of the calibration pattern, wherein the first image, the second image, and the third image each conform to a virtual display space, wherein the virtual display space comprises a second plurality of second pixel locations; and wherein the apparatus further comprises a correspondence module to determine a correspondence between the first pixel locations and the second pixel locations based upon the projector mask and the third image. In some embodiments, the correspondence module selects a portion of the third image based on the projector mask, and determines the correspondence based upon the portion of the third image. In some embodiments, the projector projects a further image based on the correspondence. Some embodiments comprise an enhancement module to generate an enhanced difference image based on the difference image; wherein the correspondence module determines the correspondence based upon the projector mask and the enhanced difference image. In some embodiments, the shape has four edges, and the reproduction module fills columns between left and right edges of the shape, fills rows between top and bottom edges of the shape, and combines the columns and rows. In some embodiments, the first image is an RGB image; the second image is an RGB image; and the selected color channel of the first image is a green color channel.

In general, in one aspect, an embodiment features tangible computer-readable media embodying instructions executable by a computer to perform a method comprising: generating a first grayscale image based on a selected color channel of a first image of ambient light upon a surface; capturing a second image of a primary color of light projected upon the surface; generating a second grayscale image based on the selected color channel of the second image; generating a difference image, comprising subtracting the first grayscale image from the second grayscale image; and generating a projector mask, comprising detecting edges of a shape in the difference image, and reproducing the shape based upon the edges of the shape.

Embodiments of the tangible computer-readable media can include one or more of the following features. In some embodiments, the method further comprises: receiving a third image of a calibration pattern projected from a projector onto the display surface, wherein the projector is described by a projector space comprising a first plurality of first pixel locations, and wherein the first image, the second image, and the third image each conform to a virtual display space, wherein the virtual display space comprises a second plurality of second pixel locations; and determining a correspondence between the first pixel locations and the second pixel locations based upon the projector mask and the third image. In some embodiments, the method further comprises: selecting a portion of the third image based on the projector mask; and determining the correspondence based upon the portion of the third image. In some embodiments, the projector projects a further image based on the correspondence. In some embodiments, the method further comprises: generating an enhanced difference image, comprising enhancing the edges of the shape; wherein reproducing the shape comprises reproducing the shape based upon the edges of the shape in the enhanced difference image. In some embodiments, the shape has four edges, and wherein the method further comprises: filling columns between left and right edges of the shape; filling rows between top and bottom edges of the shape; and combining the columns and rows. In some embodiments, the first image is an RGB image; the second image is an RGB image; and the selected color channel of the first image is a green color channel.

The details of one or more implementations are set forth in the accompanying drawings and the description below. Other features will be apparent from the description and drawings, and from the claims.

DESCRIPTION OF DRAWINGS

FIG. 11 shows data members of a LineOffset object.

FIG. 12 shows data members of a LineTrackingData object.

FIG. 13 shows example code for implementing a processing loop.

The leading digit(s) of each reference numeral used in this specification indicates the number of the drawing in which the reference numeral first appears.

DETAILED DESCRIPTION

The present disclosure relates to camera-based calibration of projector-based display systems. During calibration, one or more projectors project calibration images upon a display surface. A camera captures one or more images of each projected calibration image. A projector platform creates a mapping, for each projector, between pixel locations of the camera and pixel locations of the projector. After calibration, the mappings are used to warp images prior to projection. The calibration and warping techniques can be used for multi-projector systems as well as for single-projector systems.

To reduce the amounts of data to be processed for calibration, projector masks are used during calibration. Each projector mask identifies the area in the captured images occupied by the projection of the respective projector. During calibration of a projector, the corresponding projector mask is used to extract the relevant data from the captured calibration images, thereby reducing the amount of data to be processed. However, the projector masks can have other uses as well.

According to embodiments of the present invention, each projector mask is generated as follows. A first image of ambient light upon a display surface is captured. A first grayscale image is generated based on a selected color channel of the first image. A primary color of light is projected upon the display surface. A second image of the primary color of light projected upon the display surface is captured. A second grayscale image is generated based on the selected color channel of the second image. A difference image is generated by subtracting the first grayscale image from the second grayscale image. Edges of a shape in the difference image are detected. The shape is reproduced based upon the detected edges of the shape. The reproduced shape is the projector mask.

Figure 1:
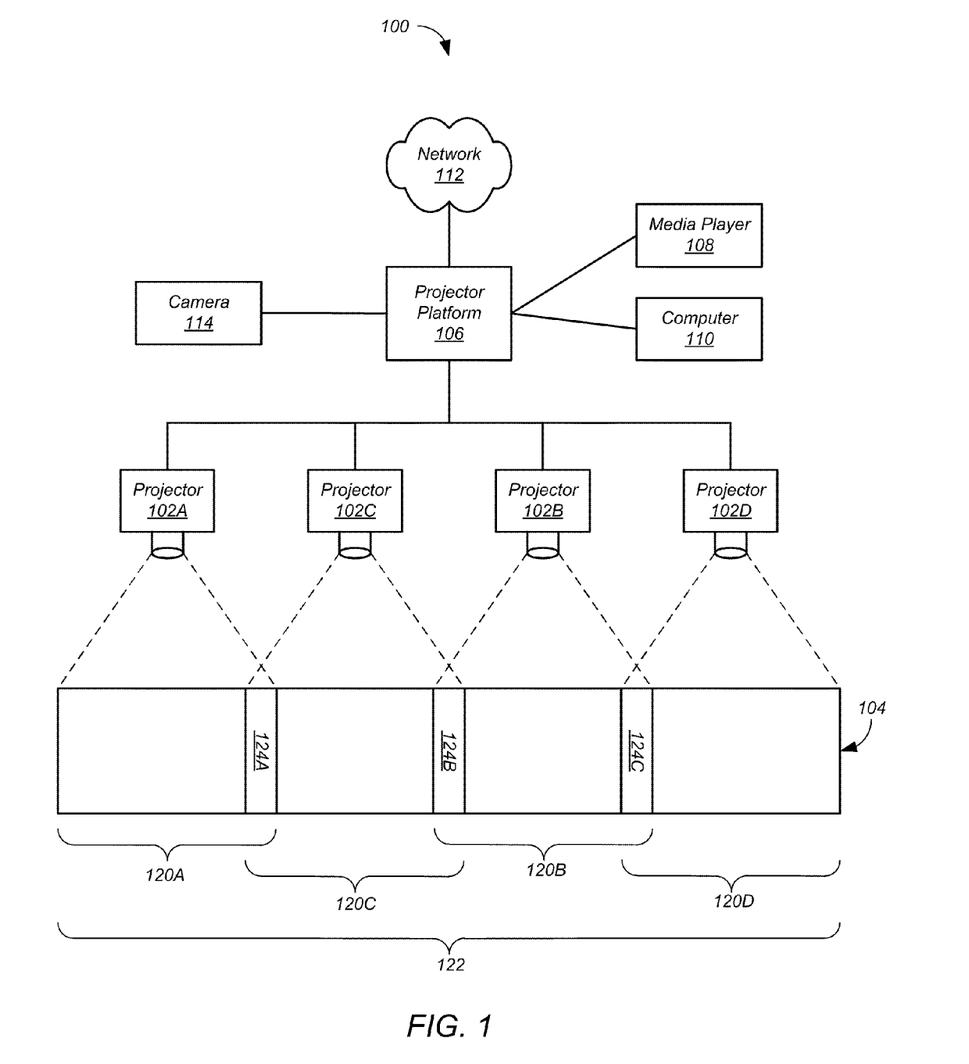
FIG. 1 shows a multi-projector display system according to some embodiments.

FIG. 1 shows a multi-projector display system 100 according to some embodiments. System 100 includes four projectors 102A-102D aimed at a display surface 104. Of course, other numbers of projectors 102 can be employed. For example, a single projector 102 can be used. Data is provided to projectors 102 by a projector platform 106, which can obtain source input from a media player 108, a computer 110, a source connected by a network 112 such as the Internet, and the like. For calibration, system 100 includes a digital still camera 114.

In one embodiment, system 100 includes four projectors 102 and projector platform 106 is implemented as a personal computer (PC) configured with a central processing unit (CPU) and graphic processing units (GPU) providing four video outputs each connected to one of projectors 102. An optional capture card provides video input from sources such as computer 110, media player 108, and the like. Digital still camera 114 is attached to the PC for the calibration process. In other embodiments, a video camera may be used for the calibration process. After calibration, digital still camera 114 may be removed or used as a media input device by projector platform 106.

Projectors 102A-102D produce respective component projections 120A-120D upon display surface 104. Together component projections 120A-120D form a single composite projection 122. Note that component projections 120 overlap in regions 124A-124C.

Figure 2:
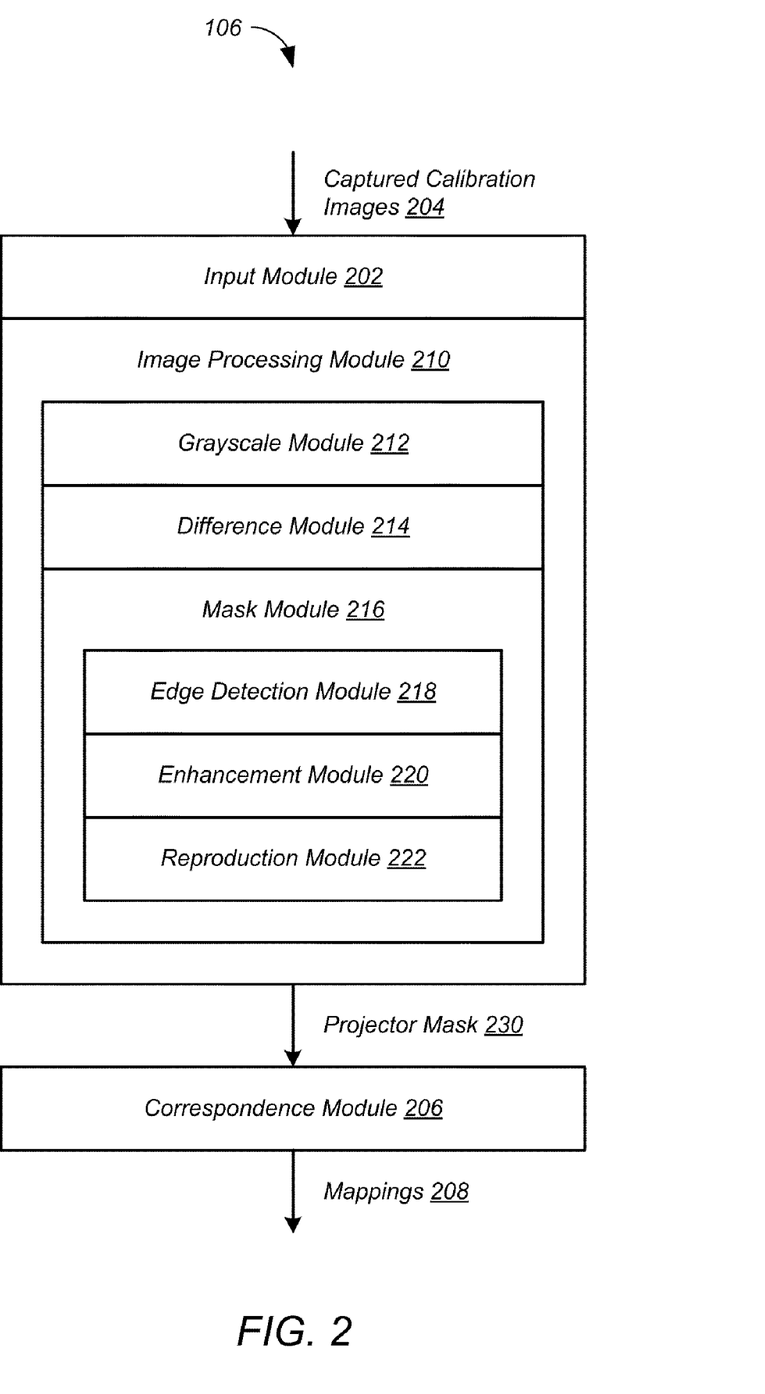
FIG. 2 shows elements of the projector platform of FIG. 1 for calibrating the projectors of FIG. 1 according to some embodiments.

FIG. 2 shows elements of projector platform 106 of FIG. 1 for calibrating projectors 102 according to some embodiments. Although in the described embodiments, apparatus elements are presented in one arrangement, other embodiments may feature other arrangements, as will be apparent to one skilled in the relevant arts based on the disclosure and teachings provided herein. For example, the apparatus elements can be implemented in hardware, software, or combinations thereof.

Referring to FIG. 2, projector platform 106 includes an input module 202 adapted to receive captured calibration images 204 from camera 114 and a correspondence module 206 adapted to generate mappings 208 between pixel locations of camera 114 and pixel locations of projectors 102 based on one or more projector masks 230. Projector platform 106 also includes an image processing module 210 to generate projector mask(s) 230. Image processing module 210 includes a grayscale module 212, a difference module 214, and a mask module 216. Mask module 216 includes an edge detection module 218, a enhancement module 220, and a reproduction module 222.

Figure 3A:
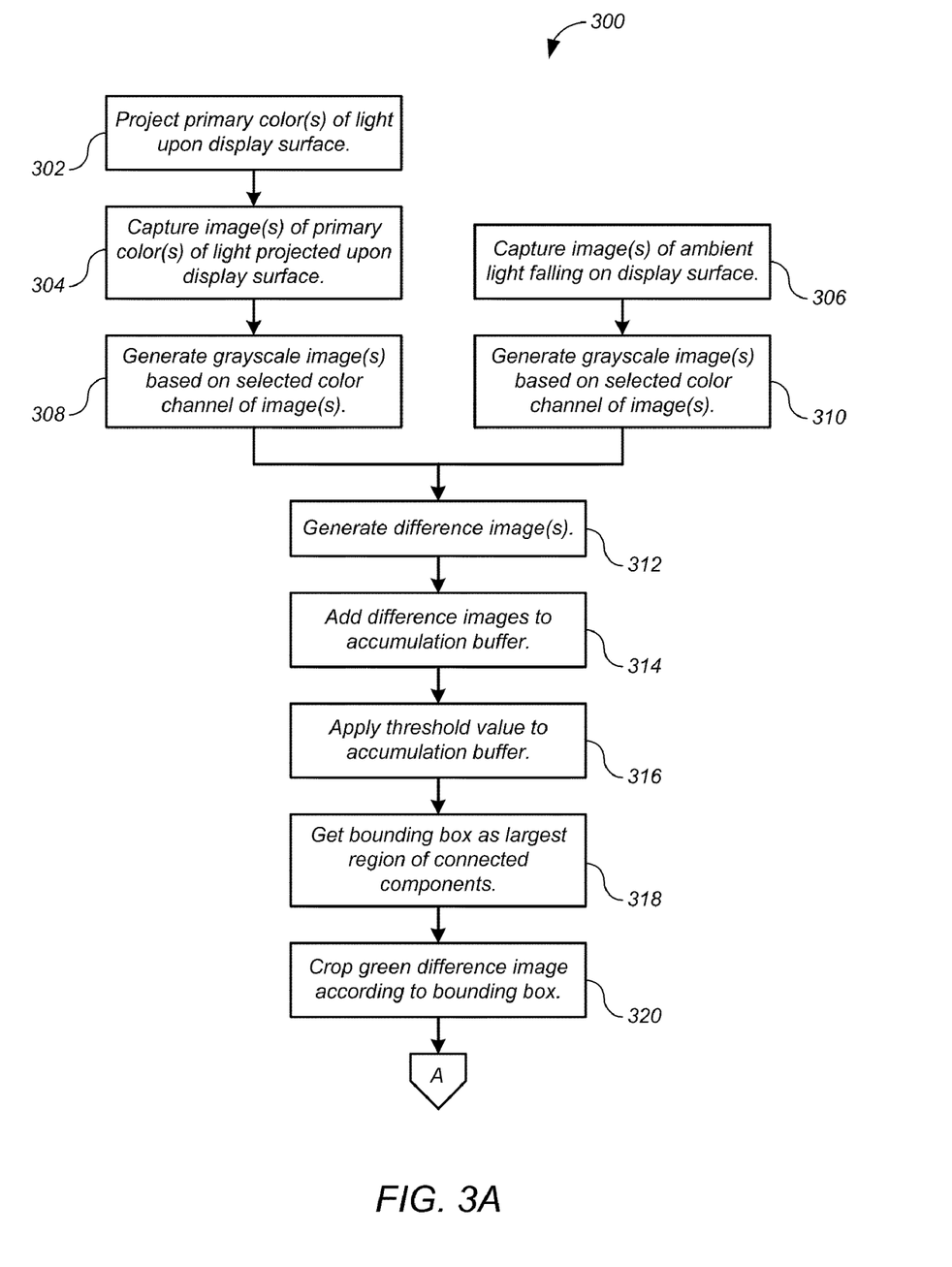
FIGS. 3A-3B show a process for the projector platform of FIG. 2 for generating and using a projector mask according to some embodiments.
Figure 3B:
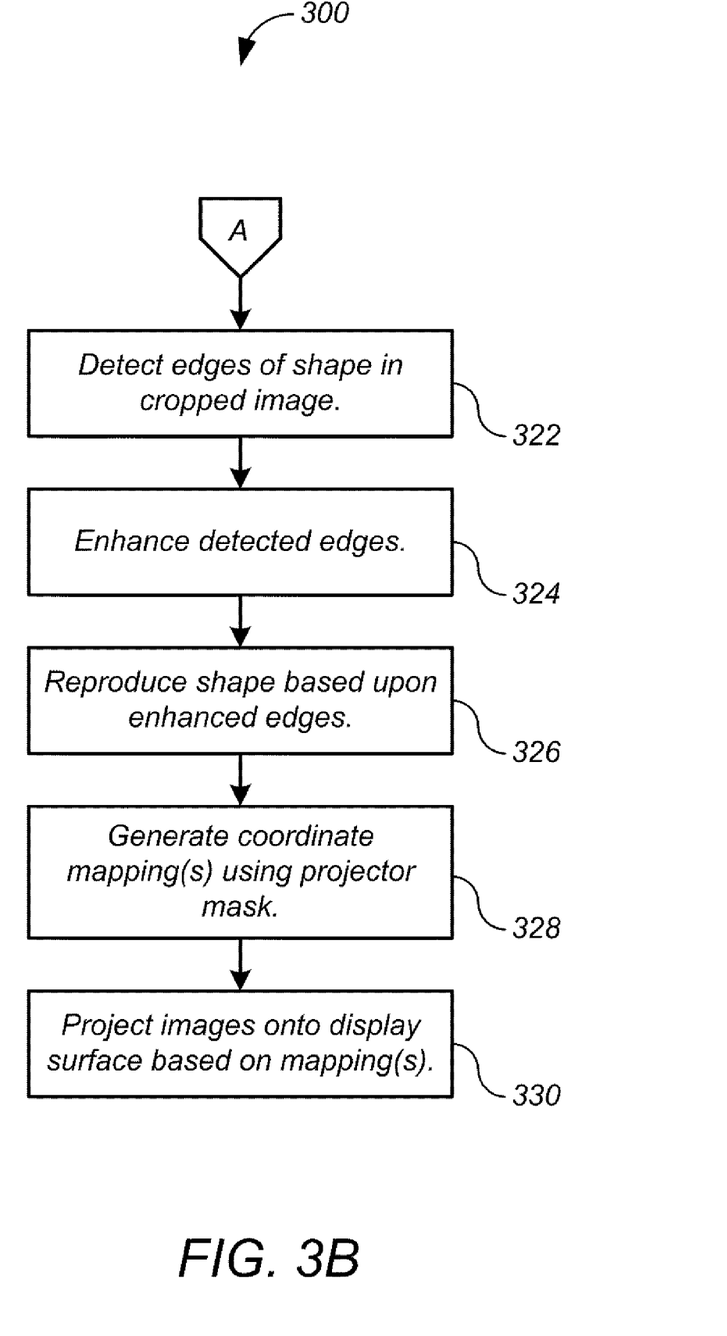

FIGS. 3A-3B show a process 300 for projector platform 106 of FIG. 2 for generating and using a projector mask 230 according to some embodiments. Although in the described embodiments, the elements of the processes disclosed herein are presented in one arrangement, other embodiments may feature other arrangements, as will be apparent to one skilled in the relevant arts based on the disclosure and teachings provided herein. For example, in various embodiments, some or all of the steps of the disclosed processes can be executed in a different order, concurrently, and the like. Elements of process 300 can be repeated for each projector 102 in multi-projector systems such as system 100.

Referring to FIGS. 3A-3B, process 300 begins with data capture. Projector 102 projects one or more primary colors of light upon display surface 104 (step 302). For clarity, the pixel locations in the projector coordinate space are referred to herein as "projector pixel locations" or "projector pixels." Camera 114 captures each image of a primary color of light projected upon display surface 104 (step 304). For example, the primary colors can be red, green, and blue.

The exposure settings are configured for camera 114. Each color, and even display mode (for example, raster versus solid), affects how light is projected, reflected, and captured. Therefore system 100 uses a number of different exposure settings depending on the type of image being captured. For example, the three primary colors are projected at maximum output values (255). The exposure setting of camera 114 are configured to capture images at a similar input value, with the requirement that no pixel exceed 255, thereby ensuring no information is lost. In a typical configuration the light fall off from the projector is such that an area in the center of the projector region is slightly under 255 but the edges fall off to values around 200 or even lower along the edges.

Camera 114 also captures one or more images of ambient light falling on display surface 104 (step 306). During the ambient capture, all light from projector 102 is blocked so only the ambient light falling on surface 104 is captured. One ambient image is captured for each primary color image, and with the same exposure settings used for capturing the respective primary color image. Continuing the above example, three ambient images are captured, with the respective exposure settings used for capturing the red, green, and blue images.

The captured color and ambient images are referred to herein collectively as calibration images 204. Each captured calibration image 204 conforms to a virtual display space that includes a plurality of pixel locations. In some embodiments, the virtual display space is defined by the frame of camera 114. That is, virtual display space has the same resolution and dimensions as the frame of camera 114. Therefore, for clarity, the pixel locations in the virtual display space are referred to herein as "camera pixel locations" or "camera pixels." In other embodiments, other virtual display spaces can be used.

After data capture, the data is processed by projector platform 106. Input module 202 of projector platform 106 receives the captured images. Image processing module 210 of projector platform 106 processes the images to create a projector mask 230 for each projector. The processing occurs in the virtual display space, for example, at the resolution and size of the images captured by camera 114.

In some embodiments, calibration images 204 are captured by camera 114 in RGB format. However, while embodiments are described in terms of RGB format, other formats can be used instead, as will be apparent after reading this disclosure. Experience has shown that the red channel of the RGB format is the most noisy, followed by the blue channel, then the green channel. Therefore processing can be limited to the green color image, or to the green and blue color images. Of course, any color, all three colors, or any combination thereof, can be used. In the embodiments described below, only the green and blue color images are used.

Image processing module 210 first determines a rectangular bounding box containing the projection of the projector 102 being processed. An accumulation buffer for projector 102 is initialized to zero. Grayscale module 212 generates a grayscale image for each captured calibration image 204 based on a selected color channel of each image 204. That is, grayscale module 212 generates a grayscale image for each captured primary color image (step 308), and for each captured ambient image (step 310). In some embodiments, grayscale module 216 selects the green color channel from the captured green color image and the corresponding ambient image, thereby creating a pair of "green" grayscale images. Grayscale module 212 also selects the blue color channel from the captured blue color image and the corresponding ambient image, thereby creating a pair of "blue" grayscale images. In some embodiments, a 3×3 median filter is applied to each grayscale image to reduce noise levels in the images.

Figure 4:
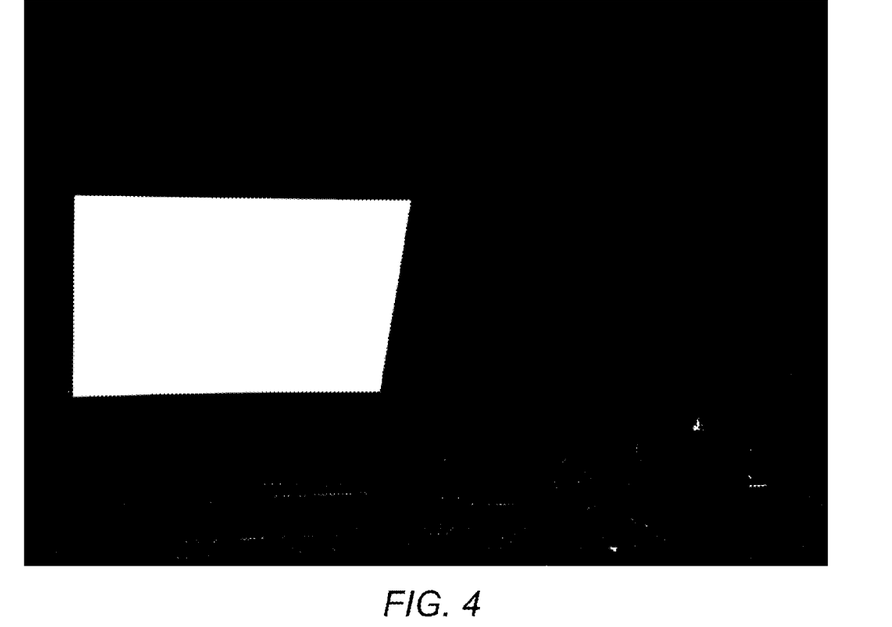
FIG. 4 shows an example thresholded difference image.

For each pair of grayscale images, difference module 214 subtracts the ambient grayscale image from the corresponding color grayscale image, thereby creating a difference image (step 312). Each difference image is added to the accumulation buffer (step 314). An iterative thresholding method that returns a single threshold value is then applied to the accumulation buffer (step 316). For each pixel in the accumulation buffer, if the value is greater than the threshold value, the new value is set to one. For values less than or equal to the threshold value, the new value is set to zero. FIG. 4 shows an example thresholded difference image. Note that some noise can be seen in the bottom third of FIG. 4.

Next a connected component algorithm is applied to the accumulation buffer to find the largest region of connected components (step 318). A rectangular bounding box that encompasses the projection of projector 102 in the virtual display space is returned. A small margin can be added to the bounding box.

Figure 5:
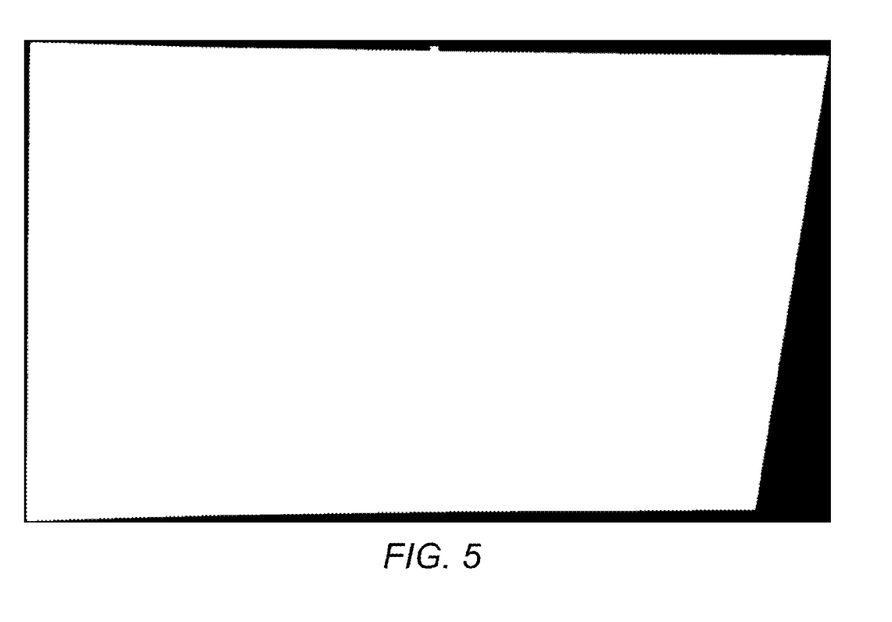
FIG. 5 shows an example of a thresholded image.

In environments that are extremely bright in the area of the projector region, the initial thresholding may not differentiate the projection from surrounding areas with high lighting levels. To account for such conditions, an additional step is performed to obtain a more accurate bounding box. The original bounding box is used to crop an image from the "green" difference image, that is, the image created by subtracting the "green" ambient grayscale image from the "green" color grayscale image. An iterative thresholding method is applied to the extracted image to return another threshold value. This value is applied to each pixel in the extracted image, with values greater than the threshold value set to one and values equal or smaller than the threshold values set to zero. FIG. 5 shows an example of a thresholded image.

Again connected components are used to find the largest region in the image of FIG. 5. The refined rectangular bounding box is returned. The bounding box is examined to see if a significantly smaller region was found inside the small image. If so this new bounding box size and position within the full camera image are calculated. A small margin can be added to the new bounding box. The resulting bounding box identifies the area in captured calibration images 204 occupied by the projection of projector 102 within the virtual display space.

Figure 6:
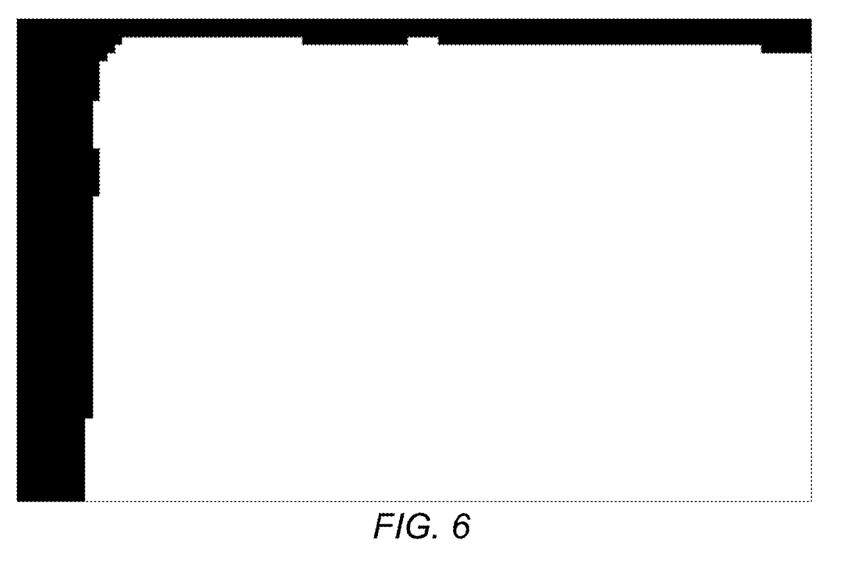
FIG. 6 is a close-up view of a corner of the image of FIG. 5.

Next mask module 216 generates projector mask 230 based on the new bounding box. According to one approach, projector mask 230 can be generated by thresholding the image of FIG. 5 with a single value. Unfortunately, due to the single-value thresholding, the resulting image has very rough edges, which adversely affect the results of using the image as a projector mask 230. This can be seen in FIG. 6, which is a close-up view of a corner of the image of FIG. 5. Instead of this approach, the process described below is used.

Figure 7:
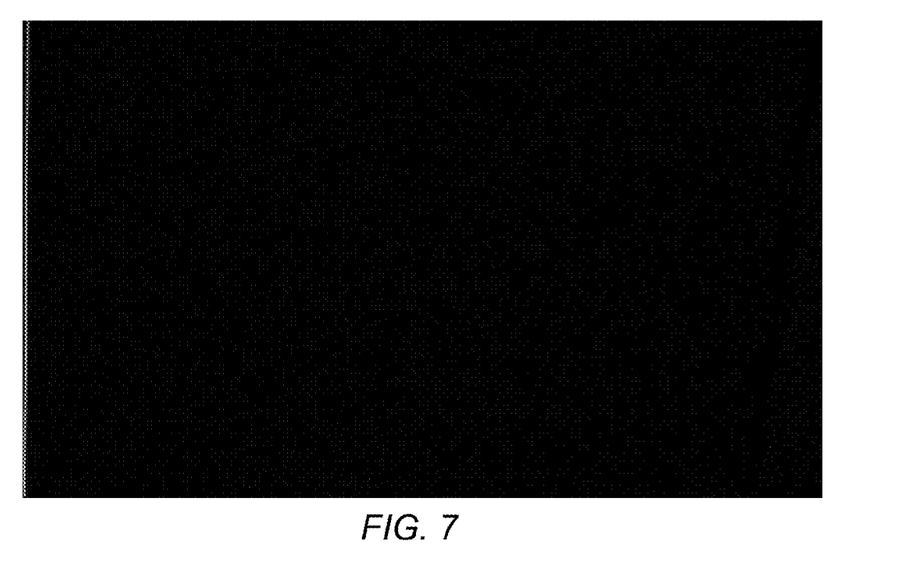
FIG. 7 shows an image containing the left edge for the shape of FIG. 5.

In the described embodiments, the green difference image generated above is used. Of course, difference images from other color channels can be used instead. The green difference image is cropped according to the bounding box (step 320). Edge detection module 218 detects the edges of the shape in the cropped image (step 322). In particular, a line detection algorithm is used to detect the left, right, top, and bottom edges. In detecting vertical edges, edge detection module 218 applies an edge detect filter to select the left edge of the shape using the gradient moving from dark to light when moving from left to right across the cropped image. Similar processing is applied to detect the other edges of the shape. The end result is four images with the detected edges. FIG. 7 shows an image containing the left edge for the shape of FIG. 5.

Figure 8:
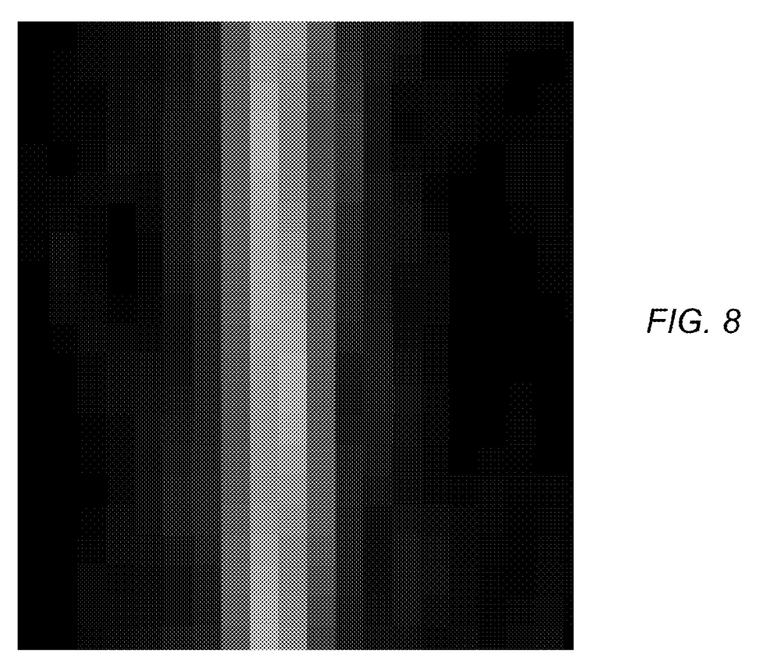
FIG. 8 is a close-up view of the edge of FIG. 7.
Figure 9:
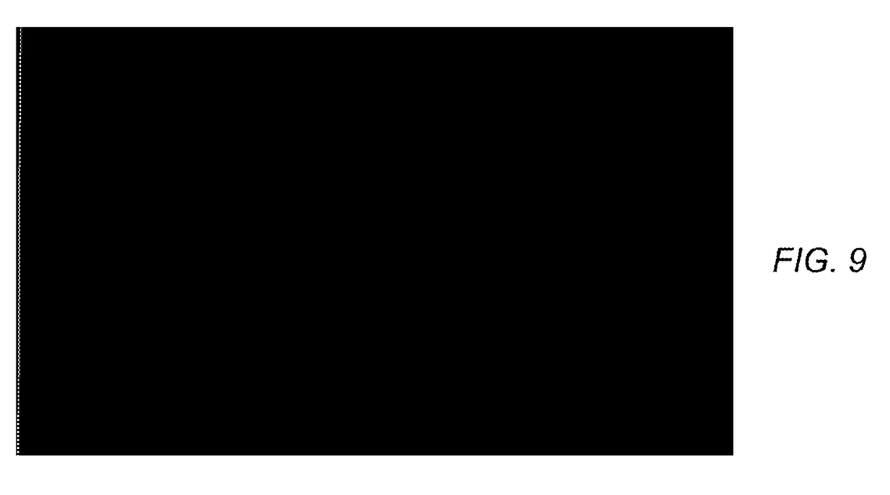
FIG. 9 shows the result of line enhancement for the edge of FIG. 7.
Figure 10:
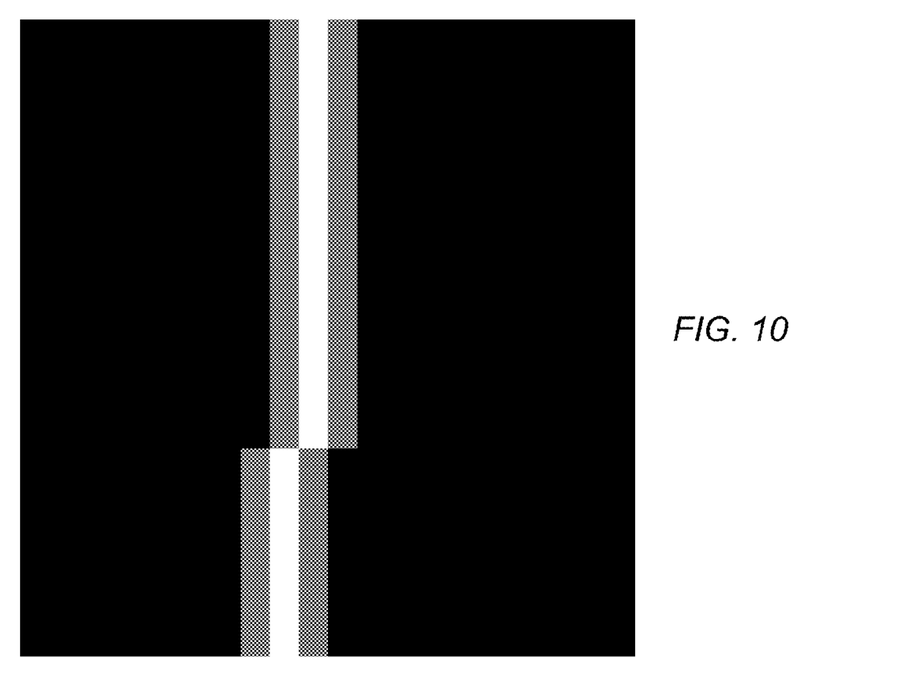
FIG. 10 is a close-up view of the edge in FIG. 9.

FIG. 8 is a close-up view of the edge of FIG. 7. As can be seen in FIG. 8, the lines created by the edge detection algorithm are not as precise as needed to create an accurate projector mask 230. The lines span multiple pixels and include noise. Therefore, enhancement module 220 enhances the detected edges (step 324). In particular, enhancement module 220 processes the detected edges to obtain lines that are only a single pixel wide. As part of the line enhancement, the lines are extended to the edge of the image, as shown in FIG. 9. FIG. 10 is a close-up view of the line in FIG. 9. The gray bands on each side of the line in FIG. 10 can be added by enhancement module 220, but are not needed. A line enhancement process according to some embodiments is now described.

The line enhancement process first identifies the line columns that cross the midpoint of the image. An average of the middle row, middle row−N pixels, and middle row+N pixels is taken in case there is a missing pixel in the middle row. This process produces an array of LineOffset objects identifying each line. The data members of the LineOffset object are shown in FIG. 1.

Next the LineOffset objects are used to find the average line spacing and line width to help with the processing and detection of lines that appear only in the corners and do not cross the middle point of the image. With the information stored in the LineOffset object, a LineTrackingData object is created for each line. The LineTrackingData object is used to keep information about the state of the line as each row is processed. The data members of the LineTrackingData object are shown in FIG. 12.

A processing loop is started to process each row starting from the middle row down to the top row (0 offset) in the image. A row of pixels is read from the raster image, and each line in the LineTrackingData array is processed. For each line the offset of the maximum intensity value offset in found within the bounds of the line previously processed. When finding two equal intensity values, the offset that may match an equal offset in the previous row is favored. This helps keep a consistent line without shifting values on every row, which would lead to a jagged line. Also, the maximum value is compared to previous values to make sure the intensity is within a predetermined percentage. This helps the process detect when the line path is fading, for example near the edges of the image.

Once the maximum intensity pixel is found for the line bounds, the average intensity value is calculated for the previous N samples. Again, a number of checks are made to see if the maximum intensity pixel is within a certain percentage of the average, and whether the offset is within the bounds of the LINE_STRAY constant to avoid any large leaps due to noise or distortion. If the maximum intensity pixel is valid, the LineTrackingData object is updated with the current offset, which equals the maximum intensity value offset minus the average line width. This is the offset used to start the search for the maximum intensity pixel in the next row processed. The output image is written with a single pixel of 255 at the location calculated for the maximum intensity pixel. In addition a pixel value of 129 is written to the column next to the maximum intensity location and a pixel of value 128 is written to the right column. The additional pixels (129 and 128 values) are used because in subsequent processing there may be slight gaps between the lines.

If any problems are detected with either the maximum intensity offset or its value, a line tracking failure count is updated. If there are more than three consecutive rows with problems, the LineTrackingData object is marked as no longer tracking. In subsequent rows the line is ignored and no longer tracked.

When all lines from the middle to the top of the image have been processed, the LineTrackingData object is reset with the original line LineOffset data. Next a processing loop is started to process lines from the middle of the image up to the bottom of the image. Example code for implementing the processing loop is shown in FIG. 13. Once all the lines in the image have been processed, the image is saved. This process is repeated for the right, top and bottom lines.

Figure 14A:
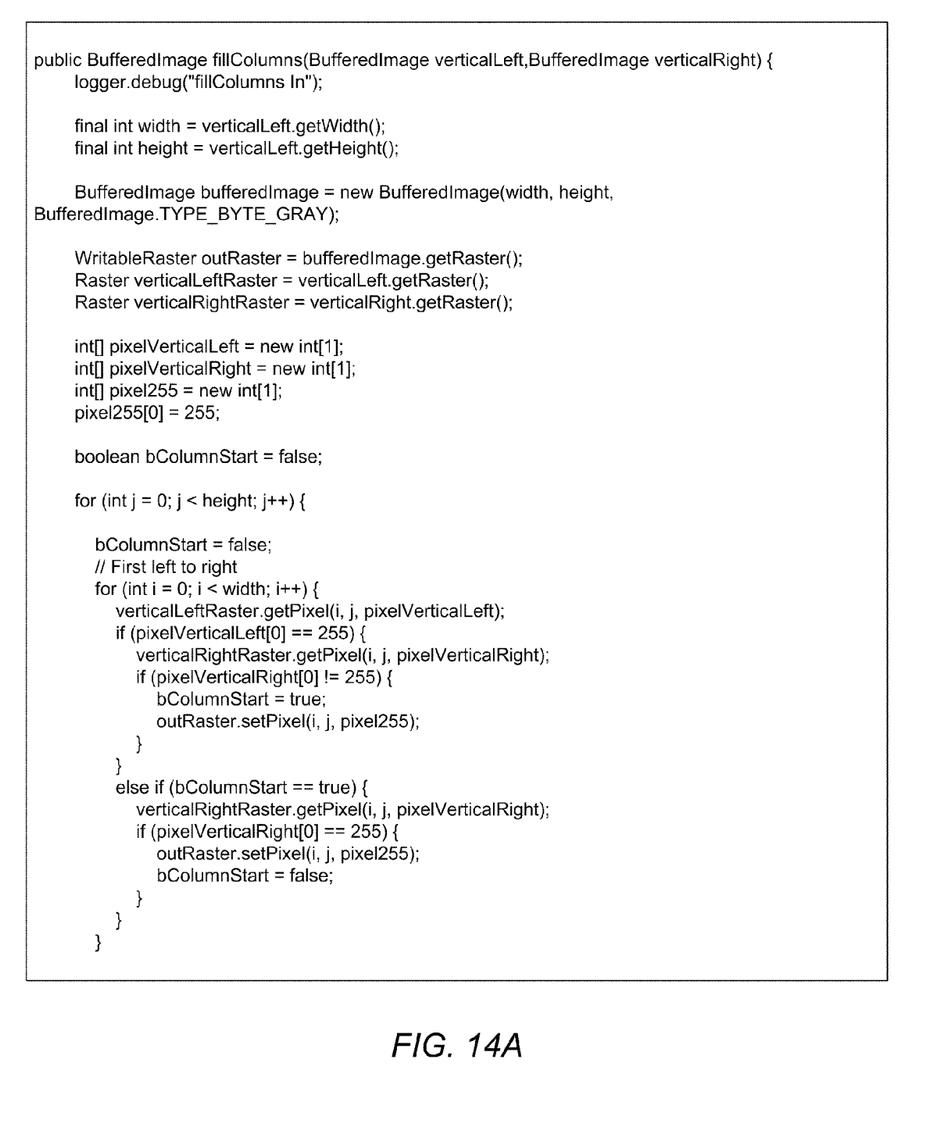
FIGS. 14A-B show an example column filling process according to some embodiments.
Figure 14B:
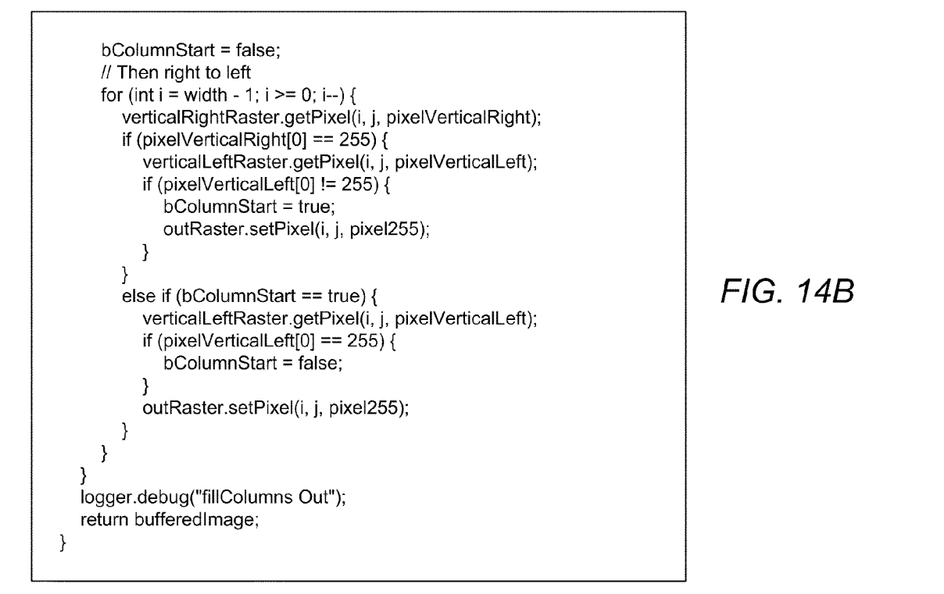
Figure 15A:
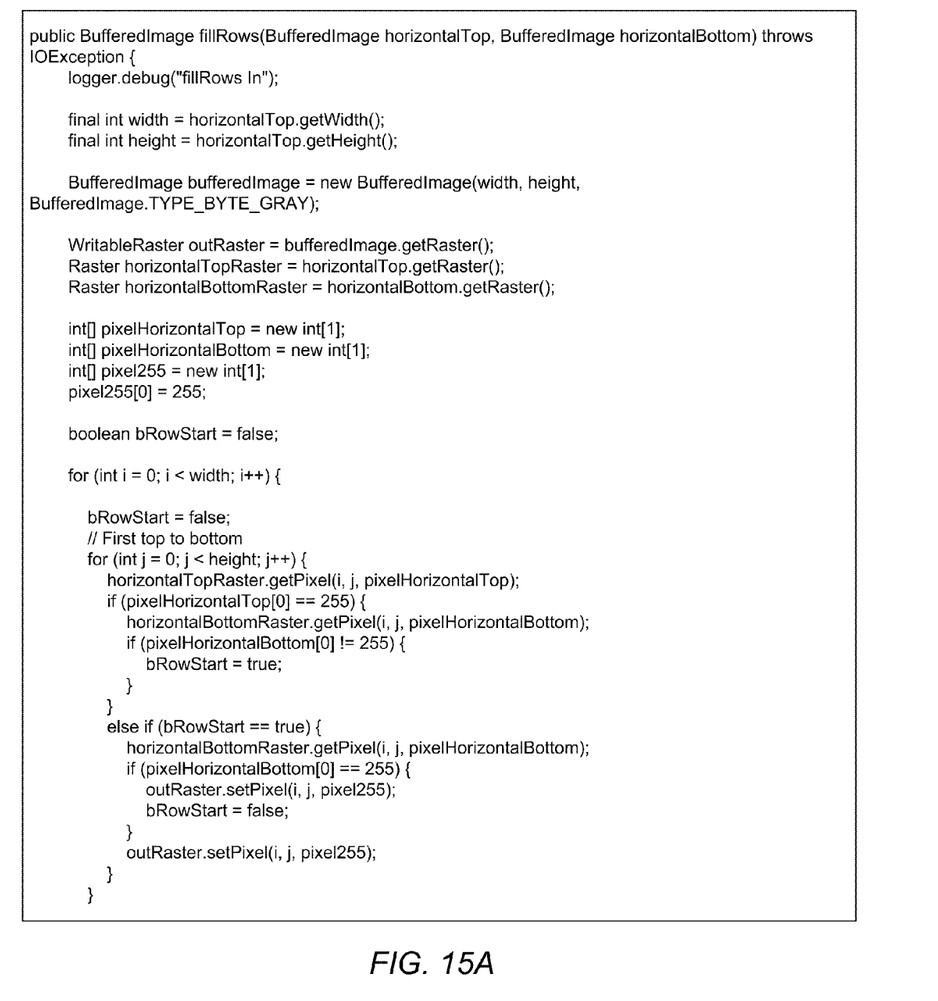
FIGS. 15A-B show an example row filling process according to some embodiments.
Figure 15B:
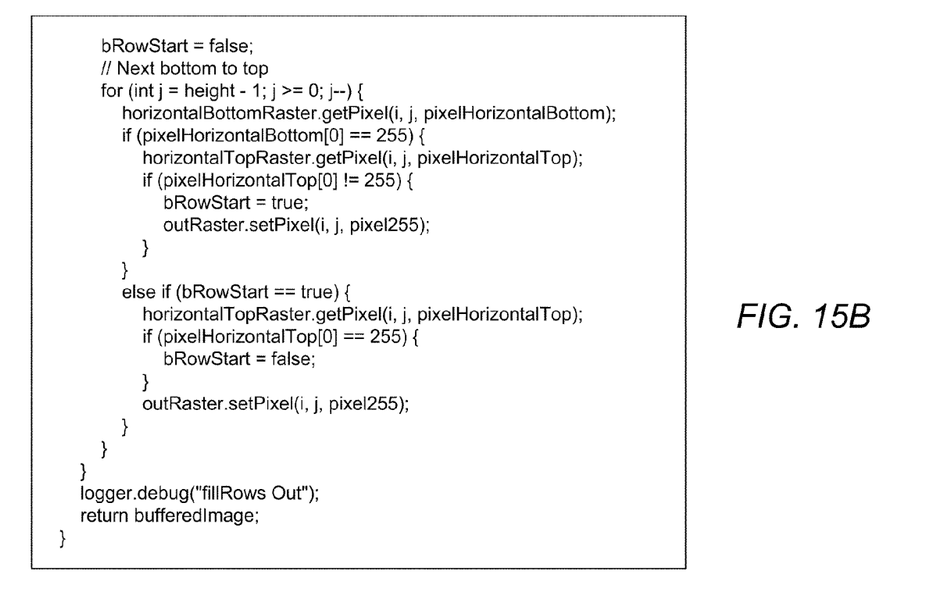
Figure 16:
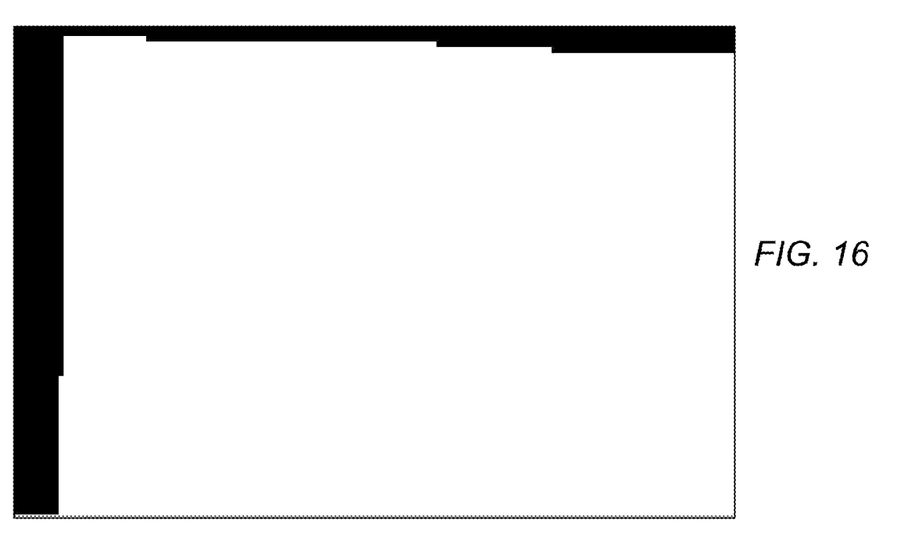
FIG. 16. shows a close-up view of an accurate projector mask with clean edges generated according to some embodiments.

After line enhancement, reproduction module 222 reproduces the shape based upon the enhanced edges (step 326). That is, reproduction module 222 fills the space between the enhanced lines representing the detected edges of the shape. In some embodiments, a column filling process is used to fill the region between the left and right vertical lines. The column filling process first fills from left to right and then right to left. FIGS. 14A-B show an example column filling process according to some embodiments. Next a row filling processing step is used to fill the region between the top and bottom lines, again in two passes: from top to bottom and from bottom to top. FIGS. 15A-B show an example row filling process according to some embodiments. The result is two images, the first with the area filled between the left and right lines, and the second with the area filled between the top and bottom lines. The two images are combined using an AND operation to create a new image where each pixel contains 255 if the corresponding pixel in the two images are both equal to 255. Otherwise the new image pixel value is set to zero. The end result is an accurate projector mask 230 with clean edges, as shown in a close-up view in FIG. 16.

After generating a projector mask 230 for a projector 102, a coordinate mapping 208 can be generated. Correspondence module 206 generates the coordinate mapping 208 by determining the correspondence between projector pixels and camera pixels based upon projector mask 230 and one or more captured calibration images 204 (step 328). Mapping 208 can be generated according to conventional techniques. For example, projector 102 can be used to project one or more calibration images upon display surface 104. The calibration images can include horizontal and vertical lines and stripes. The stripes can be gray coded. Of course, other sorts of calibration images can be used. Camera 114 captures the calibration images. Projector mask 230 is used to extract the data from captured calibration images 204. Mapping(s) 208 are generated based on the extracted data.

Once mapping 208 is generated for a projector 102, that mapping 208 and projector 102 can be used to project images such as still images and video frames that conform to the virtual display space. Of course, any image can be used after mapping that image into the virtual display space. Projector 102 projects these images onto display surface 104 based on mapping 208 (step 330).

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of this disclosure. Accordingly, other implementations are within the scope of the following claims.

What is claimed is:

1. A method comprising:
    capturing a first image of ambient light upon a surface;
    generating a first grayscale image based on a selected color channel of the first image;
    projecting a primary color of light upon the surface;
    capturing a second image of the primary color of light projected upon the surface;
    generating a second grayscale image based on the selected color channel of the second image;
    generating a difference image, comprising subtracting the first grayscale image from the second grayscale image; and
    generating a projector mask, comprising
        detecting edges of a shape in the difference image, and
        reproducing the shape based upon the edges of the shape.

2. The method of claim 1, further comprising:
    projecting a calibration pattern from a projector onto the display surface, wherein the projector is described by a projector space comprising a first plurality of first pixel locations;
    capturing a third image of the calibration pattern, wherein the first image, the second image, and the third image each conform to a virtual display space, wherein the virtual display space comprises a second plurality of second pixel locations; and
    determining a correspondence between the first pixel locations and the second pixel locations based upon the projector mask and the third image.

3. The method of claim 2, further comprising:
    selecting a portion of the third image based on the projector mask; and
    determining the correspondence based upon the portion of the third image.

4. The method of claim 2, further comprising:
    projecting a further image based on the correspondence.

5. The method of claim 1, further comprising:
    generating an enhanced difference image, comprising enhancing the edges of the shape;
    wherein reproducing the shape comprises reproducing the shape based upon the edges of the shape in the enhanced difference image.

6. The method of claim 1, wherein the shape has four edges, further comprising:
    filling columns between left and right edges of the shape;
    filling rows between top and bottom edges of the shape; and
    combining the columns and rows.

7. The method of claim 1:
    wherein the first image is an RGB image;
    wherein the second image is an RGB image; and
    wherein the selected color channel of the first image is a green color channel.

8. An apparatus comprising:
    a camera to capture a first image of ambient light upon a surface;
    a grayscale module to generate a first grayscale image based on a selected color channel of the first image;
    a projector to project a primary color of light upon the surface, wherein the camera captures a second image of the primary color of light projected upon the surface, and wherein the grayscale module generates a second grayscale image based on the selected color channel of the second image;
    a difference module to generate a difference image based on the first grayscale image and the second grayscale image; and
    a mask module to generate a projector mask, wherein the mask module comprises
        an edge detection module to detect edges of a shape in the difference image, and a reproduction module to reproduce the shape based upon the edges of the shape.

9. The apparatus of claim 8:

wherein the projector projects a calibration pattern onto the display surface, wherein the projector is described by a projector space comprising a first plurality of first pixel locations;

wherein the camera captures a third image of the calibration pattern, wherein the first image, the second image, and the third image each conform to a virtual display space, wherein the virtual display space comprises a second plurality of second pixel locations; and wherein the apparatus further comprises a correspondence module to determine a correspondence between the first pixel locations and the second pixel locations based upon the projector mask and the third image.

10. The apparatus of claim 9:

wherein the correspondence module selects a portion of the third image based on the projector mask, and determines the correspondence based upon the portion of the third image.

11. The apparatus of claim 9:

wherein the projector projects a further image based on the correspondence.

12. The apparatus of claim 8, further comprising:

an enhancement module to generate an enhanced difference image based on the difference image;

wherein the correspondence module determines the correspondence based upon the projector mask and the enhanced difference image.

13. The apparatus of claim 8:

wherein the shape has four edges, and wherein the reproduction module fills columns between left and right edges of the shape, fills rows between top and bottom edges of the shape, and combines the columns and rows.

14. The apparatus of claim 8:

wherein the first image is an RGB image;

wherein the second image is an RGB image; and wherein the selected color channel of the first image is a green color channel.

15. Non-transitory computer-readable media embodying instructions executable by a computer to perform a method comprising:

generating a first grayscale image based on a selected color channel of a first image of ambient light upon a surface;

capturing a second image of a primary color of light projected upon the surface;

generating a second grayscale image based on the selected color channel of the second image;

generating a difference image, comprising subtracting the first grayscale image from the second grayscale image; and generating a projector mask, comprising detecting edges of a shape in the difference image, and reproducing the shape based upon the edges of the shape.

16. The non-transitory computer-readable media of claim 15, wherein the method further comprises:

receiving a third image of a calibration pattern projected from a projector onto the display surface, wherein the projector is described by a projector space comprising a first plurality of first pixel locations, and wherein the first image, the second image, and the third image each conform to a virtual display space, wherein the virtual display space comprises a second plurality of second pixel locations; and determining a correspondence between the first pixel locations and the second pixel locations based upon the projector mask and the third image.

17. The non-transitory computer-readable media of claim 16, wherein the method further comprises:

selecting a portion of the third image based on the projector mask; and determining the correspondence based upon the portion of the third image.

18. The non-transitory computer-readable media of claim 16:

wherein the projector projects a further image based on the correspondence.

19. The non-transitory computer-readable media of claim 15, wherein the method further comprises:

generating an enhanced difference image, comprising enhancing the edges of the shape;

wherein reproducing the shape comprises reproducing the shape based upon the edges of the shape in the enhanced difference image.

20. The non-transitory computer-readable media of claim 15, wherein the shape has four edges, and wherein the method further comprises:

filling columns between left and right edges of the shape;

filling rows between top and bottom edges of the shape; and combining the columns and rows.

21. The non-transitory computer-readable media of claim 15:

wherein the first image is an RGB image;

wherein the second image is an RGB image; and wherein the selected color channel of the first image is a green color channel.

* * * * *